US007796997B2

(12) United States Patent
Kim et al.

(10) Patent No.: US 7,796,997 B2
(45) Date of Patent: Sep. 14, 2010

(54) METHOD FOR ALLOCATING RESOURCES IN A WIRELESS COMMUNICATION SYSTEM

(75) Inventors: Eung-Sun Kim, Suwon-si (KR);
Yung-Soo Kim, Seongnam-si (KR);
Cheol-Woo You, Seoul (KR);
Jong-Hyung Kwun, Seoul (KR)

(73) Assignee: Samsung Electronics Co., Ltd (KR)

( * ) Notice: Subject to any disclaimer, the term of this patent is extended or adjusted under 35 U.S.C. 154(b) by 1042 days.

(21) Appl. No.: 11/508,049

(22) Filed: Aug. 22, 2006

(65) Prior Publication Data

US 2007/0049283 A1    Mar. 1, 2007

(30) Foreign Application Priority Data

Aug. 22, 2005    (KR) .................. 10-2005-0077016

(51) Int. Cl.
*H04W 88/02*    (2009.01)

(52) U.S. Cl. ..................................... 455/450

(58) Field of Classification Search ................ 370/210, 370/330; 455/69, 452.2, 436, 443, 444, 445, 455/447, 450, 464
See application file for complete search history.

(56) References Cited

U.S. PATENT DOCUMENTS

| 7,483,483 B2 * | 1/2009 | Lakkis ................ 375/238 |
| 2003/0016770 A1 * | 1/2003 | Trans et al. ................ 375/346 |
| 2003/0086515 A1 * | 5/2003 | Trans et al. ................ 375/346 |
| 2004/0131007 A1 | 7/2004 | Smee et al. |
| 2005/0186933 A1 * | 8/2005 | Trans ................ 455/296 |

FOREIGN PATENT DOCUMENTS

| EP | 1 418 776 | 5/2004 |
| WO | WO 2004/100577 | 11/2004 |
| WO | WO 2005/046283 | 5/2005 |

OTHER PUBLICATIONS

Hassan Yaghoobi, Scalable OFDMA Physical Layer in IEEE 802.16 WirelessMAN, Intel Technology Journal, vol. 8, Issue 3, 2004, pp. 201-212.

* cited by examiner

*Primary Examiner*—Diane Mizrahi
(74) *Attorney, Agent, or Firm*—The Farrell Law Firm, LLP (57) ABSTRACT

Disclosed is a cellular-based wireless communication system, and more particularly a method for allocating resources for data transmission in a cellular-based wireless communication system employing a multicarrier scheme. Frequency resources are divided into time slots defined by one frame and the divided time slots are allocated to an uplink and the downlink. During a predetermined time period, the frequency resources are allocated as resources for transmitting sync preambles. During a next predetermined time period, the frequency resources are allocated in such a manner that the frequency resources for sectors are successively and repeatedly used as resources for transmitting broadcasting messages on a sector-by-sector basis. In the remaining time slots, except the time slots for transmitting the preambles and the broadcasting messages, the frequency resources are allocated as resources for transmitting channel estimation midambles for dynamic channel allocation.

8 Claims, 9 Drawing Sheets

METHOD FOR ALLOCATING RESOURCES IN A WIRELESS COMMUNICATION SYSTEM

PRIORITY

This application claims priority to applications filed in the Korean Industrial Property Office on Aug. 22, 2005 and assigned Serial No. 2005-77016, the contents of which are hereby incorporated by reference.

BACKGROUND OF THE INVENTION

1. Field of the Invention

The present invention relates to a cellular-based wireless communication system, and more particularly to a method for allocating resources for data transmission in a cellular-based wireless communication system employing a multicarrier scheme.

2. Description of the Related Art

With the advance and ongoing demand in communication systems, the communication systems need to provide more and various types of services. Therefore, there is an earnest need for broadband communication systems capable of providing broadband services.

Frequency resources in communication systems are generally limited, and thus the broadband communication systems also have limitations on available frequency bands. Moreover, since backward compatibility with already installed communication systems must be considered, it is difficult to design the broadband communication systems.

Broadband communication systems as presently proposed are designed on the assumption that they use different frequency bands. However, with the development of communication technologies, it is inevitable that the demand for more and more frequency bands for the broadband services will increase. Consequently, license costs for the use of frequency bands are also increasing, which leads to a situation in which various schemes proposed for providing the broadband services are delayed.

There is a desire for ways to overcome limitations on the frequency bands, that is, to solve a problem of the increase in license costs for the frequency bands, and yet to favorably provide the broadband services. One of solutions is a wireless communication system employing an OFDM scheme, which reuses the same frequency bands in order to increase the efficiency of frequency use.

To this end, in the OFDM-based wireless communication system a cell is divided into a plurality of sectors, and sectors which do not neighbor each other use the same frequency bands. Thus, a resource allocation method for this may be diversely implemented by taking into consideration the channel conditions of a terminal, the type of a user channel and so forth.

In a case of reusing frequency bands, a terminal located at a cell edge is greatly influenced by interferences with a neighbor sector using the same frequency band.

Figure 1:
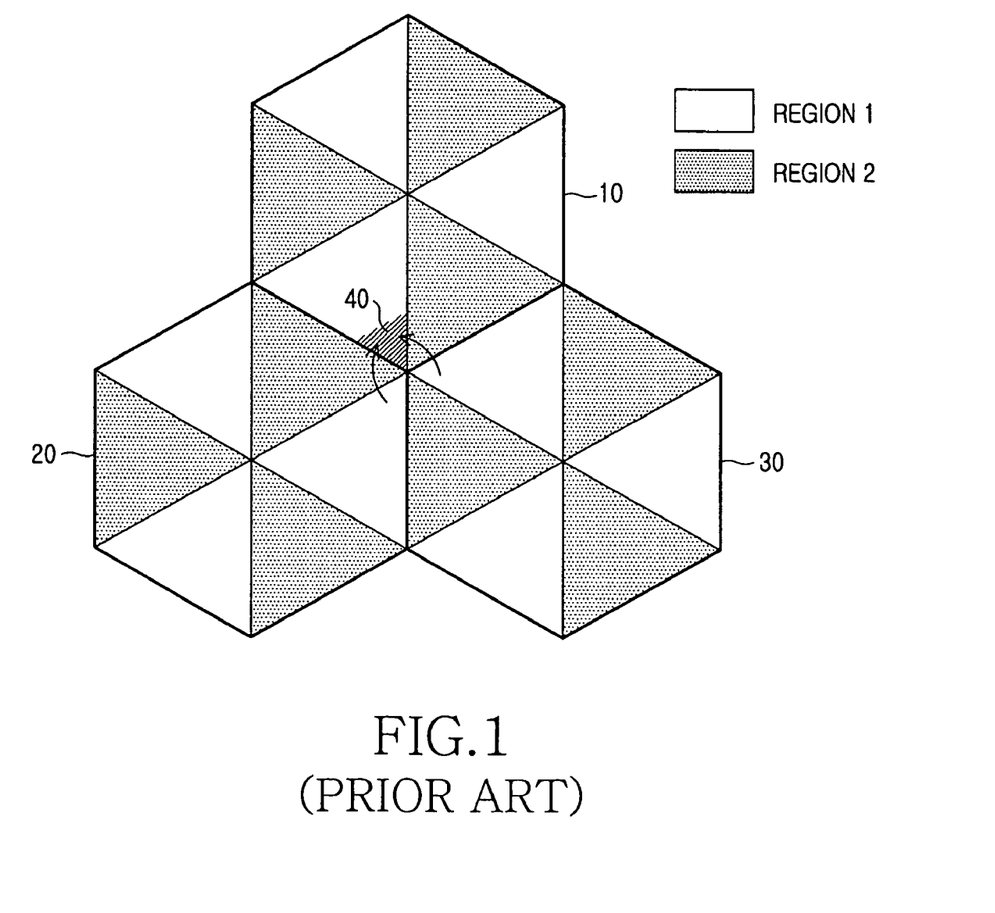
FIG. 1 illustrates a cell structure with a frequency reuse factor of 2, and an example of downlink resource allocation for such a cell structure.

FIG. 1 illustrates a cell structure with a frequency reuse factor of 2, and an example of downlink resource allocation for such a cell structure. In FIG. 1, cells 10, 20, 30 are each divided into 6 sectors. Since the frequency reuse factor is 2, the sectors are grouped into two regions (region 1 and region 2) in which frequency resources are dividedly used. That is, the respective sectors belong to any one of the regions 1 and 2, and are separated from each other such that sectors belonging to the region 1 do not neighbor sectors belonging to the region 2. Thus, the respective sectors are not theoretically influenced by other neighbor sectors.

However, a terminal located at a cell edge 40 is greatly influenced by interferences from signals of other neighbor sectors using the same frequency resource. This is because the intensity of a signal from a base station is very low at the cell edge 40, and thus the signal is difficult to discriminate from other signals of neighbor sectors using the same frequency resource.

SUMMARY OF THE INVENTION

Accordingly, the present invention has been made to solve at least the above-mentioned problem occurring in the prior art, and an object of the present invention is to provide a method for allocating resources according to frequency reuse in a cellular-based wireless communication system employing a multicarrier scheme.

A further object of the present invention is to provide a method for allocating resources in a cellular-based wireless communication system employing a multicarrier scheme, in which resources for a terminal located at a cell edge are separately allocated.

A further object of the present invention is to provide a method for allocating resources and receiving the allocated resources, in which when one cell is divided into sectors based upon a plurality of criteria, the sectors can be compatibly used.

To accomplish these objects, in accordance with one aspect of the present invention, there is provided a method for allocating downlink frequency resources in a communication system that includes A sectors and uses a multicarrier scheme, the method including allocating a first downlink free frequency resource to a first sector during a first time period from a first timing point of a downlink frame; allocating a second downlink frequency resource to the first sector during a second time period from a second timing point of the downlink frame; and allocating a third downlink frequency resource to the first sector during a third time period from a third timing point of the downlink frame, wherein the first sector is one sector of the A sectors, the first downlink frequency resource is different from first downlink frequency resources allocated in each of sectors among the A sectors except the first sector during the first time period from the first timing point, wherein, when frequency resources, capable of usage in the communication system, are divided into A groups, the second downlink frequency resource is a first group as an arbitrary group among the A groups, and the first is different from groups allocated in each of sectors among the A sectors except the first sector during the second time period from the second timing point, wherein the third downlink frequency resource is used to transmit dynamic channel allocation information, the third downlink frequency resource is identical to third downlink frequency resources allocated in each of sectors among the A sectors except the first sector during the third time period from the third timing point, and the dynamic channel allocation information is different from dynamic channel allocation information of sectors among the A sectors except the first sector, and wherein each of the first timing point, the second timing point, and the third timing point are not identical to each other, each of the first time period, the second time period, and the third time period may or may not be identical to each other, and A is an integer greater than or equal to 2.

In accordance with another aspect of the present invention, provided is a method for receiving signals using downlink frequency resource in a communication system that includes A sectors and uses a multicarrier scheme, the method including receiving a first signal using a first downlink frequency resource allocated to a first sector during a first time period from a first time point of a downlink frame; receiving a second signal using a second downlink frequency resource allocated to the first sector during a second time period from a second timing point of the downlink frame; and receiving a third signal using a third downlink frequency resource allocated to the first sector during a third time period from a third timing point of the downlink frame, wherein the first sector is one sector of the A sectors, and the first downlink frequency resource is different from first downlink frequency resources allocated in sectors among the A sectors except the first sector during the first time period from the first timing point, wherein, when frequency resources, capable of usage in the communication system, are divided into A groups, the second downlink frequency resource is a first group as an arbitrary group among the A groups, and the first group is different from groups allocated in each of sectors among the A sectors except the first sector during the second time period from the second timing point, wherein the third downlink frequency resource is used to transmit dynamic channel allocation information, the third downlink frequency resource is identical to third downlink frequency resources allocated in each of sectors among the A sectors except the first sector during the third time period from the third timing point, and the dynamic channel allocation information is different from dynamic channel allocation information of sectors among the A sectors except the first sector, and wherein each of the first timing point, the second timing point, and the third timing point are not identical to each other, each of the first time period, the second time period, and the third time period may or may not be identical to each other, and A is an integer greater than or equal to 2.

In accordance with another aspect of the present invention, provided is an apparatus for allocating downlink frequency resources in a communication system that includes A sectors and uses a multicarrier scheme, the apparatus including a transmitter for allocating a first downlink frequency resource to a sector during first time period from a first timing point of a downlink frame, allocating a second downlink frequency resource to the first sector during a second time period from a second timing point of the downlink frame, and allocating a third downlink frequency resource to the first sector during a third time period from a third timing point of the downlink frame, wherein the first sector is one sector of the A sectors, and the first downlink frequency resource is different from first downlink frequency resources allocated in each of sectors among the A sectors except the first sector during the first time period from the first timing point, wherein, when frequency resources, capable of usage in the communication system, are divided into A groups, the second downlink frequency resource is a first group as an arbitrary group among the A groups, and the first group is different from groups allocated in each of sectors among the A sectors except the first sector during the second time period from the second timing point, wherein the third downlink frequency resource is used to transmit dynamic channel allocation information, the third downlink frequency resource is identical to third downlink frequency resources allocated in each of sectors among the A sectors except the first sector during the third time period from the third timing point, and the dynamic channel allocation information is different from dynamic channel allocation information of sectors among the A sectors except the first sector, and wherein each of the first timing point, the second timing point, and the third timing point are not identical to each other, each of the first time period, the second time period, and the third time period may or may not be identical to each other, and A is an integer greater than or equal to 2.

In accordance with another aspect of the present invention, provided is an apparatus for receiving signals using downlink frequency resource in a communication system that includes A sectors and uses a multicarrier scheme the apparatus including a receiver for receiving a first signal using a first downlink frequency resource allocated to a first sector during a first time period from a first timing point of a downlink frame, receiving a second signal using a second downlink frequency resource allocated to the first sector during a second time period from a second timing point of the downlink frame, and receiving a third signal using a third downlink frequency resource allocated to the first sector during a third time period from a third timing point of the downlink frame, wherein the first sector is one sector of the A sectors, and the first downlink frequency resource is different from first downlink frequency resource allocated in sectors among the A sectors except the first sector during the first time period from the first timing point, wherein, when frequency resources, capable of usage in the communication system, are divided into A groups, the second downlink frequency resources is a first group as an arbitrary group among the A groups, and the first group is different from groups allocated in each of sectors among the A sectors except the first sector during the second time period from the second timing point, wherein the third downlink frequency resource is used to transmit dynamic channel allocation information, the third downlink frequency resources is identical to third downlink frequency resources allocated in each of sectors among the A sectors except the first sector during the third time period from the third timing point, and the dynamic channel allocation information is different from dynamic channel allocation information of sectors among the A sectors except the first sector, and wherein each of the first timing point, the second timing point, and the third timing point are not identical to each other, each of the first time period, the second time period, and the third time period may or may not be identical to each other, and A is an integer greater than or equal to 2.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

For the convenience of explanation, resource allocation in the present invention will be described using a frame structure. That is, a description of resource allocation will be given by setting forth how resources that are allocated to each terminal within a cell are mapped and transmitted in a frame.

The present invention relates to a method for allocating resources in a cellular-based wireless communication system using a multicarrier scheme, which includes 6-sector cells with a frequency reuse factor of 2.

Figure 2:
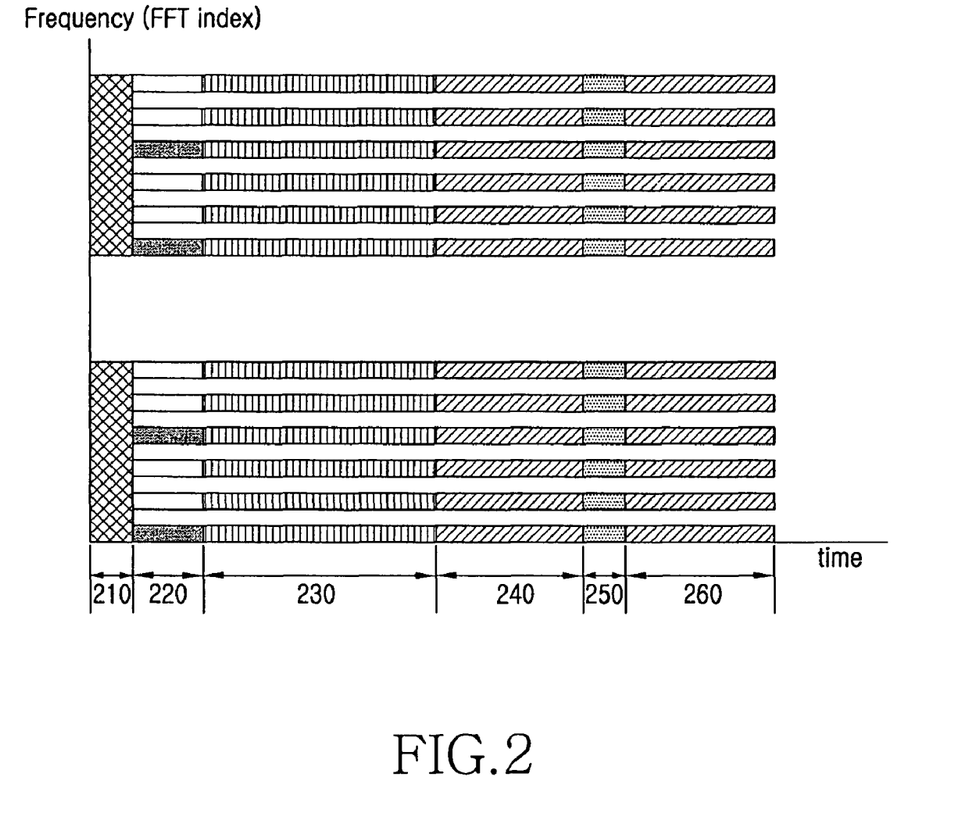
FIG. 2 illustrates a frame structure for a downlink in accordance with a first preferred embodiment of the present invention.

FIG. 2 illustrates a frame structure for a downlink in accordance with a first preferred embodiment of the present invention.

According to this embodiment, a frame for a downlink includes a synchronization (sync) preamble 210, a reuse 6 subchannel 220, an AMC (Adaptive Modulation and Coding) channel 230, diversity channels 240, 260, and a channel estimation midamble 250 in a time domain.

The sync preamble 210 is used for frame synchronization of a terminal, includes location information of reuse 2 subchannels, that is, the AMC channel 230 and the diversity channels 240, 260, and location information of the reuse 6 subchannel 220, and becomes a criterion for handoff of the diversity channels 240, 260. Since the criterion for handoff of the diversity channels 240, 260 is an average receive power over all subcarriers, and the sync preamble 210 is means measuring the average receive power over all of the subcarriers, the handoff of the diversity channels 240, 260 is performed using the sync preamble 210.

In the following description, the sync preamble 210 will be discussed in more detail.

Figure 3:
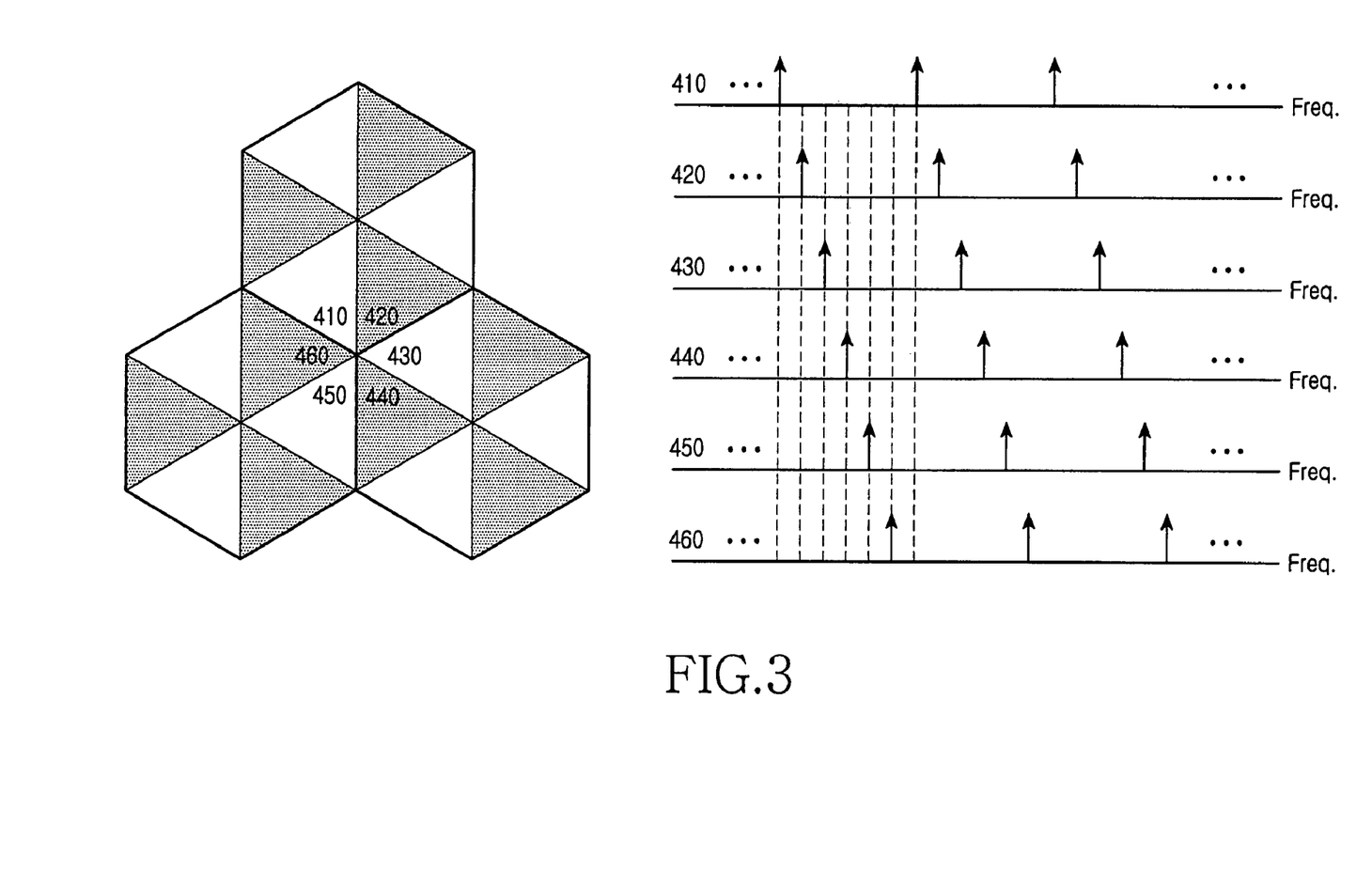
FIG. 3 illustrates sector-by-sector synchronization (sync) preamble signals in accordance with the first preferred embodiment of the present invention.

For sectors 410 to 460 located at a cell edge, the sync preambles 210 are configured at a regular frequency interval in a frequency domain as shown in FIG. 3, and sync preamble signals between the sectors have mutual orthogonality. A terminal having received the sync preambles 210 then selects a sync preamble having a maximum peak value after correlation for the received sync preambles, and performs synchronization with a frame corresponding to the selected sync preamble. That is, the terminal is synchronized with a sector having the greatest average power over all of the channels. In order to enhance efficiency and accuracy of the synchronization, information related to the type of sync preamble may be included in information on a cell or a sector, which a base station transmits.

The channel estimation midamble 250 is a channel estimation midamble for DCA (Dynamic Channel allocation), and becomes a criterion for basing handoff of the AMC channel 230. The criterion for handoff of the AMC channel 230 is not an average receive power over all subcarriers, but is whether or not a subchannel more favorable to the AMC channel exists within a cell, to which the terminal belongs, and neighbor cells. For example, there may be a specific subchannel which has a lower average power, but is more favorable to the AMC channel. However, since the channel estimation midamble 240 can measure power on a subchannel-by-subchannel basis, the channel estimation midamble 250 is used as the criterion for handoff of the AMC channel 230.

The reuse 6 subchannel 220 is a channel for transmitting essential broadcasting messages, and transmits multicast messages or dedicated data (messages) for a terminal, which has an inferior SINR (Signal to Interference plus Noise Ratio) due to being located at a cell edge, according to a given situation. The entire frequency resources are divided into 6 reuse 6 subchannels 220 and the divided 6 subchannels are successively allocated to 6 sectors. When the subchannels, each of which consists of a plurality of subcarriers, are more in number than the sectors, the 6 sectors repeatedly use the subchannels at an interval of 6 subchannels. For example, FIG. 2 shows that the reuse 6 subchannels 220 are allocated at an interval of 6 subchannels for one sector. A plurality of terminals belonging to the same sector use subchannels allocated to the corresponding sector. On a sector-by-sector basis, a plurality of terminals belonging to one sector use subchannels allocated at an interval of 6 subchannels. Then, since sync preambles 210, sectors and reuse 6 subchannels correspond on a one-to-one basis, the terminal can determine which reuse 6 subchannel 220 it must detect from among the 6 types of reuse 6 subchannels 220. A terminal located at a cell edge can use the sync preamble 210 for detecting the location of the reuse 6 subchannel 220 to be used for its downlink data transmission. Each of the sync preambles 210 of the sectors 410 to 460 located at a cell edge in FIG. 3, have a one-to-one correspondence to a reuse 6 subchannel 220 to be used in its own sector, and thus a subchannel corresponding to the frequency location of the sync preamble 210 becomes none other than a reuse 6 subchannel to be used for a terminal located at a cell edge in the sector to which the sync preamble 210 belongs. Since the terminal located at a cell edge uses a subchannel of a frequency band having orthogonality to those of neighbor sectors, it is not influenced by interferences from the neighbor sectors.

The AMC channel 230 is a channel for transmitting data to a terminal using the AMC channel 230, and the diversity channels 240, 260 are channels for transmitting data to a terminal using the diversity channels 240, 260. These AMC channel 230 and diversity channels 240, 260 are reuse 2 subchannels, and are different from the reuse 6 subchannel 220.

Every terminal within a cell synchronizes a frame with a sector to which the terminal belongs, through the sync preamble 210, and detects the location of a channel for transmitting data corresponding to the terminal, that is, the reuse 6 subchannel 220, the AMC channel 230 or the diversity channels 240, 260 in order to receive data at the corresponding location.

Figure 4:
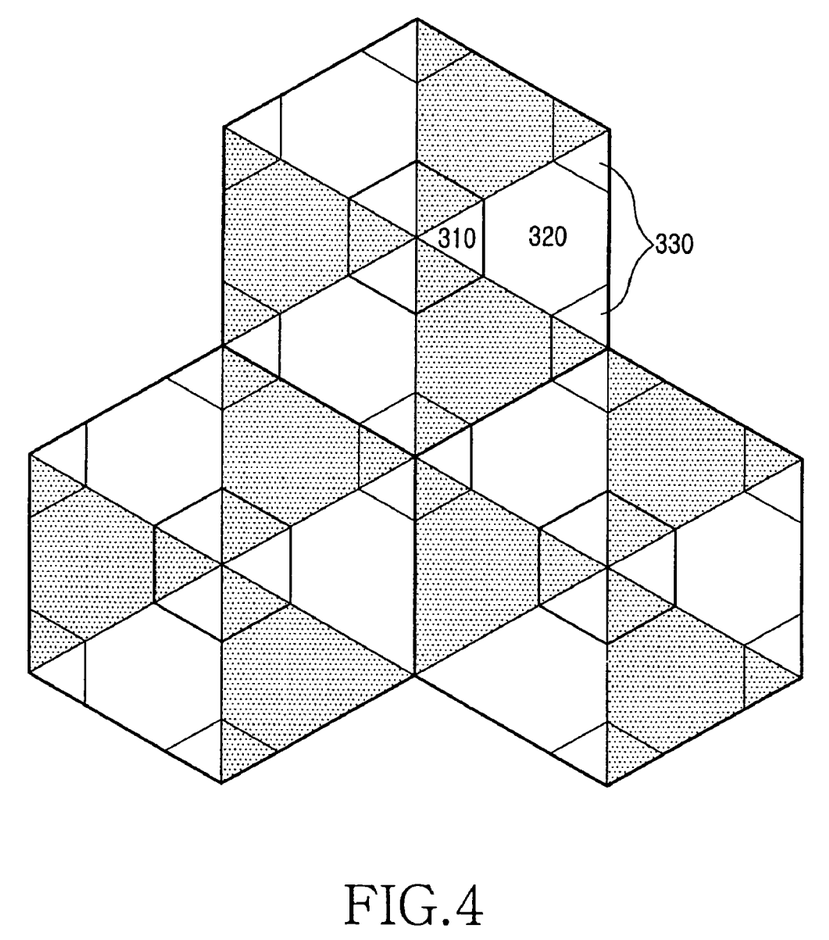
FIG. 4 illustrates a cell structure consisting of sectors in accordance with the first preferred embodiment of the present invention, and an example of downlink resource allocation for such a cell structure.

The resource allocation method according to the first preferred embodiment of the present invention is characterized in that a cell with a frequency reuse factor of 2 is divided into 6 sectors, each sector is divided into an AMC channel region 310, which is located in the center of the cell and in which the intensity of signals from a base station is strong and there is little interference influence, a diversity channel region 320, in which the intensity of signals is weaker than in the AMC channel region 310, but there is only a little interference influence, and an edge region 330 farthest from the base station, in which the intensity of signals is weak and there is much interference influence, as shown in FIG. 4, and resources for data transmission are differently allocated according to the respective regions 310 to 330 as in FIG. 2.

The channel estimation midamble 250 refers to a pilot signal having a specific pattern, which is transmitted simultaneously with the data, and a predefined pilot signal must be transmitted regardless of whether or not transmission data exists. Also, a frequency-domain signal of the channel estimation midamble 250 successively divides the respective sectors into odd sectors and even sectors, and uses 3 specific patterns in the odd and even sectors, respectively. Thus, there exist 6 types of channel estimation midambles 250. Here, the pattern means that the same frequency is used, but 3 different values allocated to the frequency exist. That is, the 3 sectors of the odd sectors use different patterns, but their frequencies are all the same. In other words, frequency resources are divided into two ones, one of which is used in the odd sector and the other of which is used in the even sector, and every 3 odd sectors use different patterns of channel estimation midambles 250 and every 3 even sectors use different patterns of channel estimation midambles 250. Thus, a total 6 types of channel estimation midambles 250 can be used while corresponding on a one-to-one basis to the sync preambles 210 divided into 6 types as in FIG. 3.

As stated above, in the resource allocation method according to the first preferred embodiment of the present invention, a cell with frequency reuse factor of 2 is divided into 6 sectors, resources are separately allocated to physical channels having different characteristics, and particularly a reuse 6 subchannel is used for a terminal located in a cell edge region.

Figure 5:
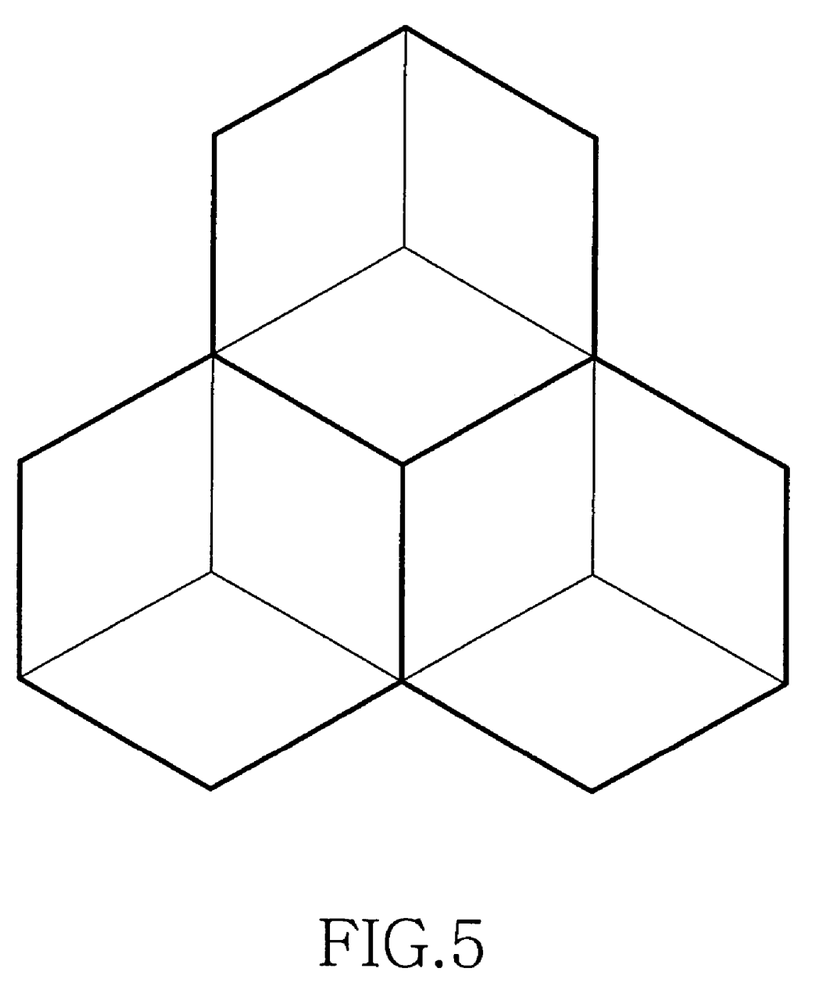
FIG. 5 illustrates a cell structure in accordance with a second preferred embodiment of the present invention.

Hereinafter, a description will be given of a method for allocating resources for a cell, which is divided into 3 sectors as shown in FIG. 5, without frequency reuse according to a second preferred embodiment of the present invention.

Figure 6:
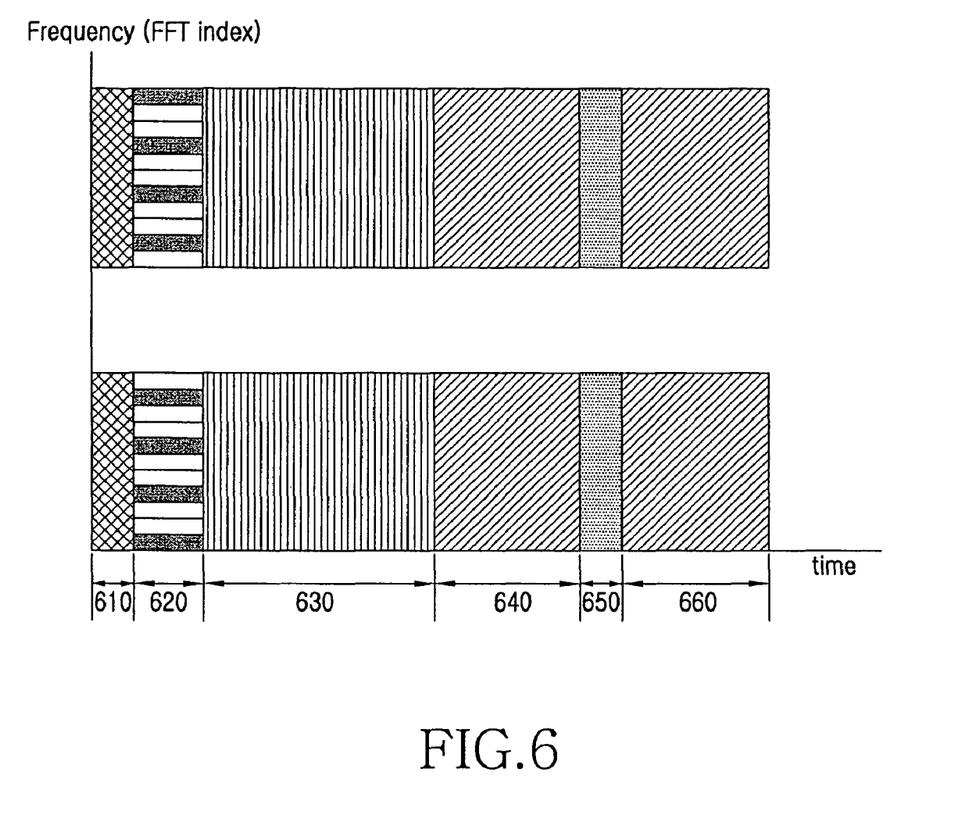
FIG. 6 illustrates a frame structure for a downlink in accordance with the second preferred embodiment of the present invention.

FIG. 6 illustrates a frame structure for a downlink in accordance with the second preferred embodiment of the present invention.

According to this embodiment, a frame for a downlink includes a sync preamble 610, a reuse 3 subchannel 620, an AMC channel 630, diversity channels 640, 660, and a channel estimation midamble 650 in a time domain.

The sync preamble 610 is used for frame synchronization of a terminal, includes location information of the AMC channel 630 and the diversity channels 640, 660 using the entire frequency band and location information of the reuse 3 subchannel, and becomes the criterion for the handoff of the diversity channels 640, 660.

In the following description, the sync preamble 610 will be discussed in more detail.

As compared with the first embodiment, since a cell is divided into 3 sectors in the second embodiment, two sectors in the first embodiment correspond to one sector in the second embodiment. Thus, for backward compatibility with the first embodiment, the 6 sync preambles used in the first embodiment are grouped into pairs and each pair of sync preambles is used in one sector in the second embodiment.

Figure 7:
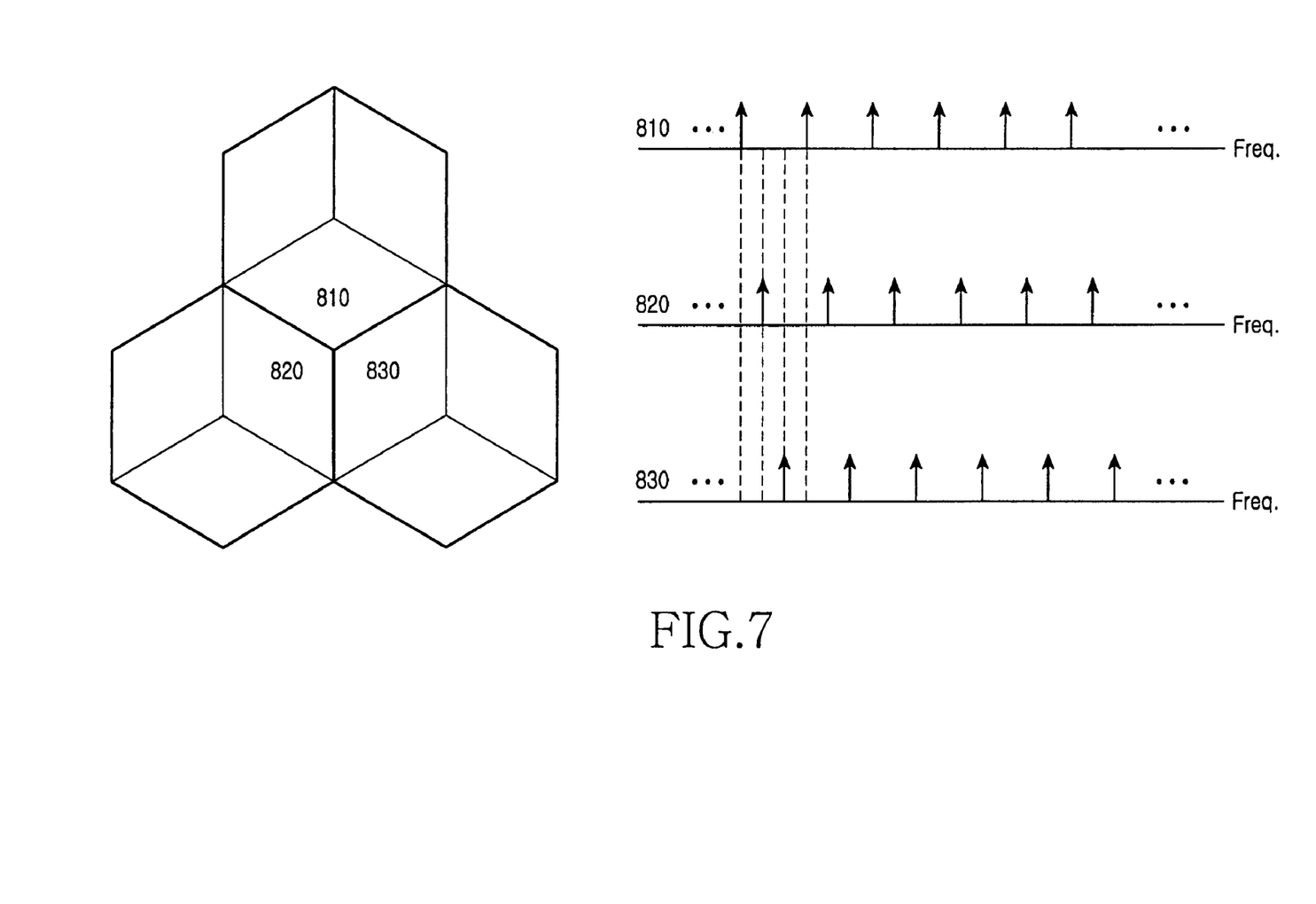
FIG. 7 illustrates sector-by-sector synchronization preamble signals in accordance with the second preferred embodiment of the present invention.
Figure 8:
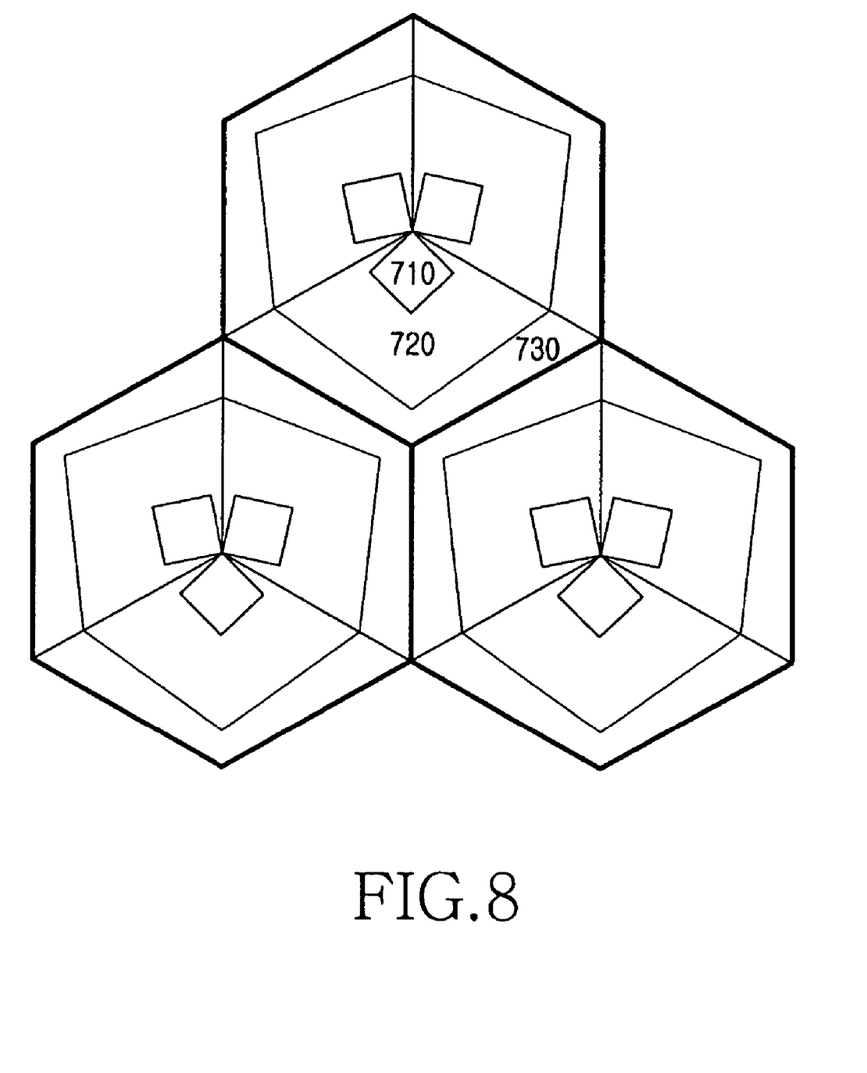
FIG. 8 illustrates a cell structure consisting of sectors in accordance with the second preferred embodiment of the present invention, and an example of downlink resource allocation for such a cell structure.

Referring to FIGS. 6, 7, and 8, for sectors 810 to 830 located at a cell edge, the sync preambles 610 are configured at a regular frequency interval in a frequency domain as shown in FIG. 7. The sync preamble signals for each sector 810 to 830 are configured at an interval of half of the signal interval in FIG. 3. This is because a cell in FIG. 7 consists of 3 sector and a cell in FIG. 3 consists of 6 sectors, and thus one sector in FIG. 7 uses signals to be used in two sectors in FIG. 3. That is, if one sector 810 in FIG. 7 uses the sync preambles of the sectors 410, 440 in FIG. 3, another sector 820 in FIG. 7 uses the sync preambles of the sectors 420, 450 in FIG. 3, and the other sector 830 in FIG. 7 uses the sync preambles of the sectors 430, 460 in FIG. 3. The three sectors 810 to 830 can be configured at the same frequency so as to have mutual orthogonality. In this way, a 3 sector-cell and a 6-sector cell can be interchangeably implemented according to circumstances.

A terminal having received the sync preambles 610 then selects a sync preamble having a maximum peak value after correlation for the received sync preambles, and performs synchronization with a frame corresponding to the selected sync preamble. The terminal is synchronized with a sector having the greatest average power over the entire channels.

The channel estimation midamble 650 is a channel estimation midamble for DCA, and becomes a criterion for handoff of the AMC channel 630.

The reuse 3 subchannel 620 is a channel for transmitting essential broadcasting messages, and transmits multicast messages or dedicated data (messages) for a terminal having an inferior SINR due to being located at a cell edge. All of the frequency resources are divided into 3 reuse 3 subchannels 620 and the divided 3 subchannels are successively allocated to 3 sectors. When the subchannels, each of which consists of a plurality of subcarriers, are greater in number than the sectors, the 3 sectors repeatedly use the subchannels at an interval of 3 subchannels.

For example, FIG. 6 shows that the reuse 3 subchannels 620 are allocated at an interval of 3 subchannels for one sector. A plurality of terminals belonging to the same sector use subchannels allocated to the corresponding sector. On a sector-by-sector basis, a plurality of terminals belonging to one sector use subchannels allocated at an interval of 3 subchannels. Then, since sync preambles 610, sectors and reuse 3 subchannels correspond on a one-to-one basis, the terminal can determine which reuse 3 subchannel 620 it must detect from among the 3 types of reuse 3 subchannels 620. That is, a terminal located at a cell edge can use the sync preamble 610 for detecting the location of the reuse 3 subchannel 620 to be used for its downlink data transmission. In other words, each of the sync preambles 610 of the sectors 810 to 830 located at a cell edge in FIG. 7 corresponds one-to-one to a reuse 3 subchannel 620 to be used in its own sector, and thus a subchannel corresponding to the frequency location of the sync preamble 610 becomes none other than a reuse 3 subchannel to be used for a terminal located at a cell edge in the sector to which the sync preamble 610 belongs. Therefore, since the terminal located at a cell edge uses a subchannel of a frequency band having orthogonality to those of neighbor sectors, it is not influenced by interferences from the neighbor sectors.

The AMC channel 630 is a channel for transmitting data to a terminal using the AMC channel 630, and the diversity channels 640, 660 are channels for transmitting data to a terminal using the diversity channels 640, 660. These AMC channel 630 and diversity channels 640, 660 do not use a frequency band in the unit of a subchannel, but use the overall frequency band.

Every terminal within a cell synchronizes a frame with a sector, to which the terminal belongs, through the sync preamble 610, and detects the location of a channel for transmitting data corresponding to the terminal. That is, the reuse 3 subchannel 620, the AMC channel 630 or the diversity channels 640, 660 to receive data at the corresponding location.

In conclusion, the resource allocation method according to the first preferred embodiment of the present invention is characterized in that a cell is divided into 3 sectors, each sector is divided into an AMC channel region 710, which is located in the center of the cell and in which the intensity of signals from a base station is strong and there is little interference influence, a diversity channel region 720, in which the intensity of signals is weaker than in the AMC channel region 710, but there is only a little interference influence, and an edge region 730 farthest from the base station, in which the intensity of signals is weak and there is much interference influence, as shown in FIG. 7, and resources for data transmission are differently allocated according to the respective regions 710 to 730 as in FIG. 7.

The channel estimation midamble 650 refers to a pilot having a specific pattern, which is transmitted simultaneously with the data, and a predefined pilot signed must be transmitted regardless of whether or not transmission data exists. Also, a frequency-domain signals of the channel estimation midamble 650 exists in three types from sector-to-sector, and the three types of channel estimation midambles 650 can be used on a sector-by-sector basis while corresponding on a one-to-one basis with the sync preambles 610 divided into 3 types as in FIG. 7.

As stated above, the resource allocation method according to the second preferred embodiment of the present invention has a feature in that a cell is divided into 3 sectors, resources are separately allocated to physical channels having different characteristics, and particularly a reuse 3 subchannel is used for a terminal located in a cell edge region.

A terminal must determine, through the sync preamble, if it is located in a 3-sector cell or a 6-sector cell, and receive data over a data channel corresponding to its location.

Figure 9:
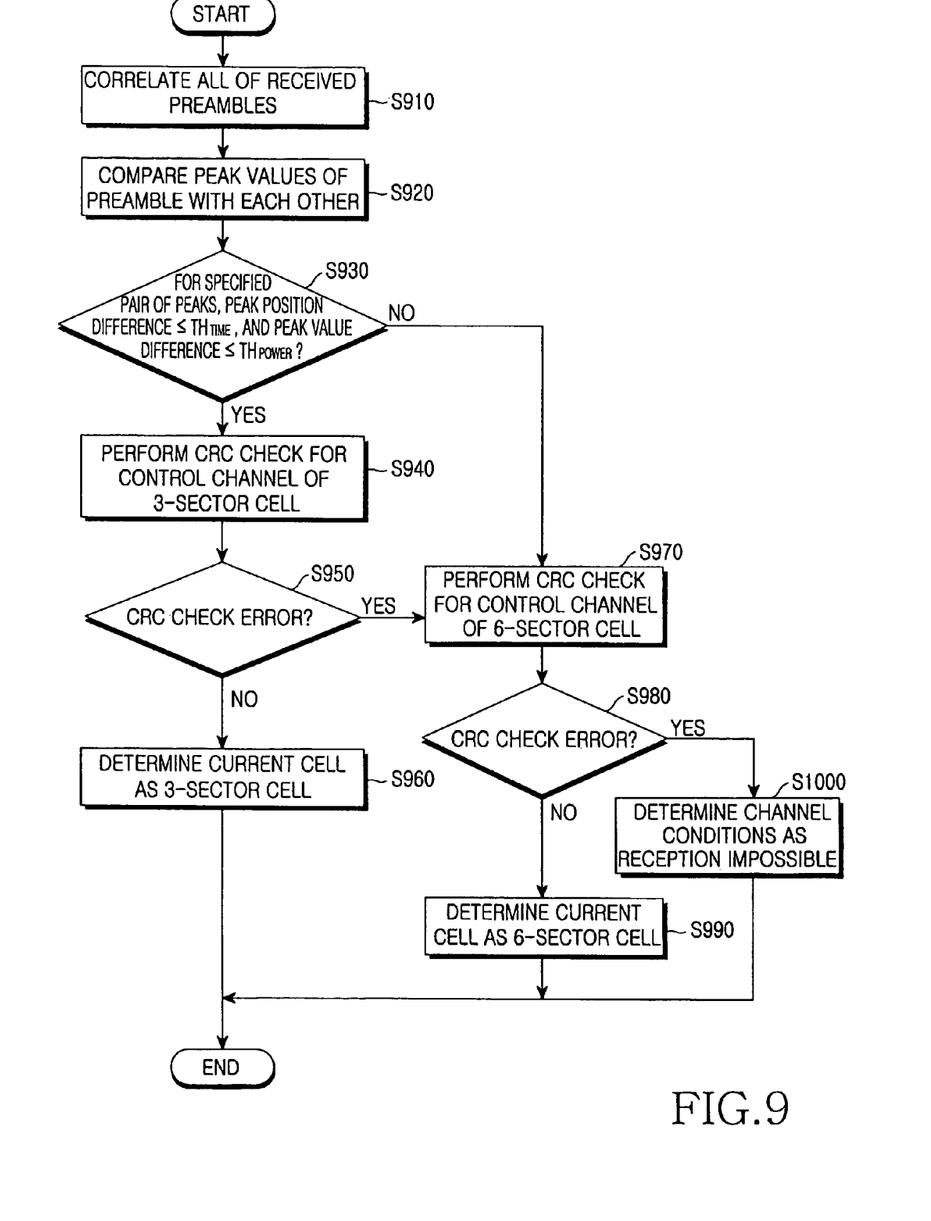
FIG. 9 is a flowchart illustrating procedures of determining on allocated resources in a receiver unit.

FIG. 9 is a flowchart illustrating a method, in which when resources are allocated according to the first and second embodiments, a terminal receives the allocated resources and determines in which sector it is located.

First, the terminal correlates all of the received sync preambles (S910). After the correlation, the terminal compares positions and values for peaks of the respective sync preambles with each other (S920). At this time, for the comparison, it is assumed that for signals in FIG. 7, that is, sync preambles in the case of a 3-sector cell, a position interval between signals, which are used in one sector, on a time axis has a threshold of $Th_{time}$, and a power difference between the signals has a threshold of $Th_{power}$.

If, for any two signals of the peaks, a position difference on a time axis is equal to or less than $Th_{time}$, and a power difference between the peak values is equal to or less than $Th_{power}$ (S930), the terminal assumes that it is currently located in any one sector of a 3-sector cell as in FIG. 7, and decodes a corresponding reuse 3 subchannel to perform a CRC (Cyclic Redundancy Check) check (S940).

If no error occurs in the CRC check of step S940 (S950), the terminal determines that it is currently located in any one sector of the 3-sector cell (S960).

However, if errors occur in the CRC check of step S940, or if the position difference on a time axis is above $Th_{time}$ in step S930, or if the power difference between the peak values is above $Th_{power}$ in step S930, the terminal assumes that it is currently located in any one sector of a 6-sector cell as in FIG. 3, and decodes a corresponding reuse 6 subchannel to perform a CRC check (S970).

If no error occurs in the CRC check of step S970 (S980), the terminal determines that it is currently located in any one sector of the 6-sector cell (S990).

However, if errors occur in the CRC check of step S970, the terminal determines its channel conditions as incapable of reception (S1000).

A frame structure very resistant to inter-sector interferences and a resource allocation method for such a frame structure have been described above. However, it is apparent to those skilled in the art that these frame structure and resource allocation method can be applied with respect to inter-cell interferences.

As described above, the present invention produces excellent resistance to inter-sector or inter-cell interferences at a cell edge by providing a resource allocation method and a terminal for receiving the resources allocated according to such a method in a cellular-based wireless communication system employing a multicarrier scheme.

Also, in the present invention, handoffs of diversity channels and an AMC channel can be distinctively performed.

Moreover, the present invention provides a cell structure or a sector structure, in which a cell with a frequency reuse factor of 2 is divided into 6 sectors, and resources are dividedly allocated to a plurality of physical channel regions of each sector such that there is no inter-sector interference.

Furthermore, the present invention provides a cell structure or a sector structure, in which a cell is divided into 3 sectors, and resources are dividedly allocated to a plurality of physical channel regions of each sector such that there is no inter-sector interference.

Still further, the number of sectors that the cell is dividable into is only limited to system design and requirements. And, although cells having 3 or 6 sectors have been described herein, the present invention can apply to cells having various numbers of sectors.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for allocating downlink frequency resources in a communication system including a base station that communicates in a cell that includes A sectors and uses a multicarrier scheme, the method comprising:

allocating, by the base station, a first downlink frequency resource to a first sector during a first time period from a first timing point of a downlink frame;

allocating, by the base station, a second downlink frequency resource to the first sector during a second time period from a second timing point of the downlink frame; and allocating, by the base station, a third downlink frequency resource to the first sector during a third time period from a third timing point of the downlink frame, wherein the first sector is one sector of the A sectors, the first downlink frequency resource is different from first downlink frequency resources allocated in each of sectors among the A sectors except the first sector during the first time period from the first timing point, wherein, when frequency resources, capable of usage in the communication system, are divided into A groups, the second downlink frequency resource is a first group as an arbitrary group among the A groups, and the first group is different from groups allocated in each of sectors among the A sectors except the first sector during the second time period from the second timing point, wherein the third downlink frequency resource is used to transmit dynamic channel allocation information, the third downlink frequency resource is identical to third downlink frequency resources allocated in each of sectors among the A sectors except the first sector during the third time period from the third timing point, and the dynamic channel allocation information is different from dynamic channel allocation information of sectors among the A sectors except the first sector, and wherein each of the first timing point, the second timing point, and the third timing point are not identical to each other, each of the first time period, the second time period, and the third time period may or may not be identical to each other, and A is an integer greater than or equal to 2.

2. The method as claimed in claim 1, wherein the first downlink frequency resource is identical to the second downlink frequency resource in a frequency domain.

3. The method as claimed in claim 1, wherein the second downlink frequency resource is used to transmit a broadcasting message.

4. The method as claimed in claim 1, wherein the dynamic channel allocation information is a pilot signal with a predetermined pattern.

5. A base station apparatus for allocating downlink frequency resources in a communication system that includes A sectors and uses a multicarrier scheme, the apparatus comprising:

a transmitter for allocating a first downlink frequency resource to a first sector during a first time period from a first timing point of a downlink frame, allocating a second downlink frequency resource to the first sector during a second time period from a second timing point of the downlink frame, and allocating a third downlink frequency resources to the first sector during a third time period from a third timing point of the downlink frame, wherein the first sector is one sector of the A sectors, and the first downlink frequency resource is different from first downlink frequency resource allocated in each of sectors among the A sectors except the first sector during the first time period from the first timing point, wherein, when frequency resources, capable of usage in the communication system, are divided into A groups, the second downlink frequency resource is a first group as an arbitrary group among the A groups, and the first group is different from groups allocated in each of sectors among the A sectors except the first sector during the second time period from the second timing point, wherein the third downlink frequency resource is used to transmit dynamic channel allocation information, the third downlink frequency resource is identical to third downlink frequency resources allocated in each of sectors among the A sectors except the first sector during the third time period from the third timing point, and the dynamic channel allocation information is different from dynamic channel allocation information of sectors among the A sectors except the first sector, and wherein each of the first timing point, the second timing point, and the third timing point are not identical to each other, each of the first time period, the second time period, and the third time period may or may not be identical to each other, and A is an integer greater than or equal to 2.

6. The apparatus as claimed in claim 5, wherein the first downlink frequency resource is identical to the second downlink frequency resource in a frequency domain.

7. The apparatus as claimed in claim 5, wherein the second downlink frequency resource is used to transmit a broadcasting message.

8. The apparatus as claimed in claim 5, wherein the dynamic channel allocation information is a pilot signal with a predetermined pattern.

* * * * *